(No Model.)

W. B. RYAN.
RETURN VENT PROTECTOR FOR PLUMBERS' TRAPS.

No. 387,961. Patented Aug. 14, 1888.

WITNESSES.
Albert D. Grover.
Edwin F. Edgett.

INVENTOR
William B. Ryan.
By H. Teschemacher
Atty

United States Patent Office.

WILLIAM B. RYAN, OF BOSTON, MASSACHUSETTS.

RETURN-VENT PROTECTOR FOR PLUMBERS' TRAPS.

SPECIFICATION forming part of Letters Patent No. 387,961, dated August 14, 1888.

Application filed February 26, 1887. Serial No. 229,026. (No model.)

*To all whom it may concern:*

Be it known that I, WILLIAM B. RYAN, a citizen of the United States, residing at Boston, in the county of Suffolk and State of Massachusetts, have invented a Return-Vent Protector for Plumbers' Traps, of which the following is a full, clear, and exact description, reference being had to the accompanying drawings, making part of this specification, in which—

Figure 1:
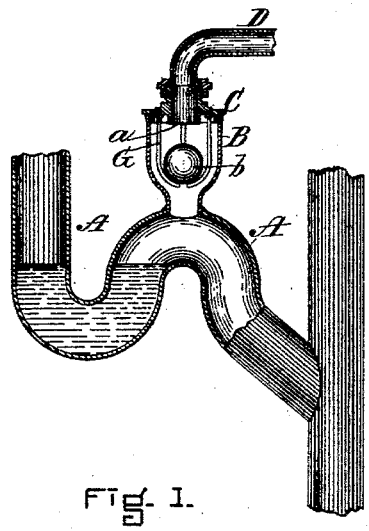
Figure 3:
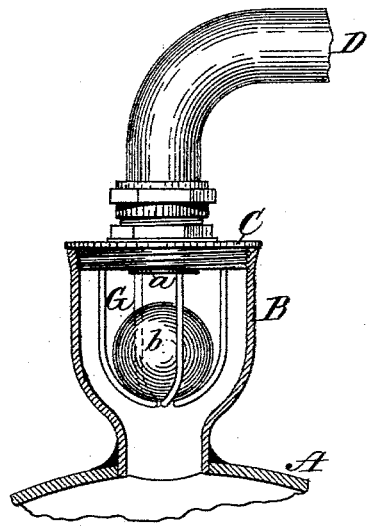
Figure 2:
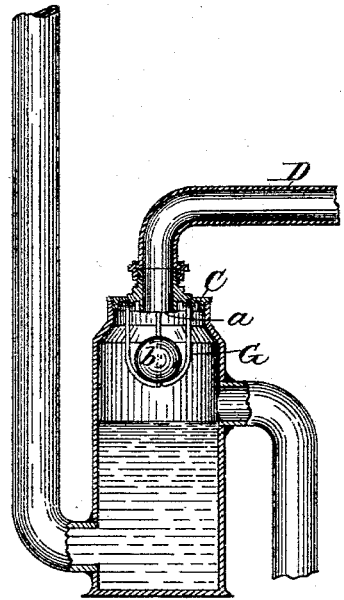

Figure 1 is a vertical section of an S-trap having my return - vent protector applied thereto. Fig. 2 is a vertical section of a cylindrical trap provided with my return-vent protector. Fig. 3 is an elevation of the lower end of the return vent-pipe with the screw-cap and vent-protector applied thereto.

My invention relates to a protecting device for automatically preventing the "return vent-pipe" of a plumber's trap from becoming obstructed by the rise therein of grease or filth caused by the flowing back of the same into the trap in the event of the outlet or discharge pipe becoming obstructed. In plumbers' traps as now constructed the mouth of the vent-pipe where it enters the upper portion of the trap is left entirely open and unprotected; hence when the water and grease or filth mixed therewith is caused to flow back into the trap by any obstruction in the outlet-pipe it often rises up within the vent-pipe and lodges therein, completely clogging and obstructing it, so as to prevent ventilation, and when the outlet or discharge pipe is freed from obstruction the ventilating-pipe is often overlooked through carelessness and remains clogged, thus rendering it useless, and, furthermore, rendering the trap liable to become emptied by siphonage of the water through the discharge-pipe, as a vacuum can be formed within the trap when the vent-pipe is closed.

My invention has for its object to overcome these objections; and it consists in the combination, with the return vent-pipe of a plumber's trap, of a loose rubber or other buoyant ball placed within a cage and supported thereby a short distance below the mouth of the vent-pipe, whereby when the water flows back into the trap and rises therein it will carry the ball up against the open mouth of the vent-pipe and tightly close the same, thus effectually excluding all liquid and solid matter therefrom and rendering it impossible for the vent-pipe to become clogged or obstructed, whereby the perfect ventilation of the trap is at all times insured—a desideratum hitherto unattained.

In the said drawings, A represents an S-trap, upon the top of which is placed a casing or receptacle, B, which communicates with the interior of the trap, as seen in Fig. 1. Within the top of the casing B is fitted a screw-cap, C, through which passes the lower end of the return vent-pipe D, which leads into the main ventilating-pipe, (not shown,) and thus serves to ventilate the trap, the open mouth *a* of the vent-pipe D being situated just below the under surface of the screw-cap. To the under side of this screw-cap C is secured a wire cage, G, within which is placed a ball, *b*, preferably composed of rubber, the cage being constructed to support the ball a short distance below and directly under the open mouth *a* of the vent-pipe D and above the level of the water seal.

In case the outlet-pipe of the trap should become clogged or obstructed, the water will flow back and fill the trap, as usual, when the ball *b* will be floated and carried by the water up against the open mouth *a* of the vent-pipe D, thus closing the same tightly and effectually preventing the entrance of either liquid or solid matter, which renders it impossible for the vent-pipe to become obstructed under any circumstances whatever—a desideratum hitherto unattained and a most important advantage, as it can always be known with certainty that the vent-pipe is free and clear, whereas there has always been a liability heretofore of its being left stopped up through carelessness or neglect to examine the same after cleaning the trap from an obstruction. As soon as the trap is cleared by removing the obstruction from the outlet-pipe, the ball *b* will fall back to its normal position, leaving the vent-pipe D open and free from all obstruction, as required.

In Fig. 2 my invention is represented as applied to an ordinary cylindrical or round trap, such as is usually employed for sinks, bowls, bath-tubs, &c. In this case, as there is sufficient space within the upper portion of the trap, the auxiliary casing or receptacle B is dispensed with and the screw-cap C, with its cage and ball, screwed directly into the upper portion of the trap, the vent-pipe passing through the screw-cap in the same manner as previously described. It is obvious, however, that my improvement may be applied to a plumber's trap of any description in which a return vent-pipe is used.

What I claim as my invention, and desire to secure by Letters Patent, is—

1. In a plumber's trap, the combination, with the return vent-pipe, of a buoyant ball placed within a cage beneath the open mouth of the vent-pipe and adapted to close the same when the outlet-pipe becomes obstructed and the water rises within the trap, substantially as set forth.

2. In a plumber's trap, the combination, with the vent-pipe D and the screw-cap C, through which it passes, of the cage G, depending from the under side of the cap C, and the buoyant ball $b$, inclosed within said cage and supported thereby beneath the open mouth of the vent-pipe, substantially in the manner and for the purpose described.

3. The combination, with a plumber's trap provided with a casing or receptacle, B, connected therewith, of the screw-cap C, fitting within the top of the casing B and having the cage G secured to and depending from its under side, the vent-pipe D, passing through the cap C, and the ball $b$, inclosed within the cage G and supported thereby beneath the open mouth of the vent-pipe, substantially as and for the purpose set forth.

Witness my hand this 21st day of February, A. D. 1887.

WILLIAM B. RYAN.

In presence of—
P. E. TESCHEMACHER,
ISAAC N. TUCKER.